(12) United States Patent
Chen

(10) Patent No.: US 10,120,165 B2
(45) Date of Patent: Nov. 6, 2018

(54) WIDE ANGLE SIX-PIECE LENS

(71) Applicant: KINKO OPTICAL CO., LTD., Taichung (TW)

(72) Inventor: See-Ying Chen, Taichung (TW)

(73) Assignee: KINKO OPTICAL CO., LTD., Taichung (TW)

( * ) Notice: Subject to any disclaimer, the term of this patent is extended or adjusted under 35 U.S.C. 154(b) by 0 days.

(21) Appl. No.: 15/237,982

(22) Filed: Aug. 16, 2016

(65) Prior Publication Data

US 2017/0336603 A1    Nov. 23, 2017

(30) Foreign Application Priority Data

May 17, 2016    (TW) .............................. 105115150 A

(51) Int. Cl.
*G02B 13/18*    (2006.01)
*G02B 13/00*    (2006.01)
*G02B 27/00*    (2006.01)
*G02B 9/62*    (2006.01)

(52) U.S. Cl.
CPC ........... *G02B 13/0045* (2013.01); *G02B 9/62* (2013.01); *G02B 27/0025* (2013.01)

(58) Field of Classification Search
CPC ............ G02B 13/0045; G02B 27/0025; G02B 13/18; G02B 13/04; G02B 9/62; G02B 13/16; G02B 7/028; G02B 13/00; G02B 13/24; G02B 21/02; G02B 9/60; G02B 13/0025
USPC .................... 359/658, 671, 713, 752, 761
See application file for complete search history.

(56) References Cited

U.S. PATENT DOCUMENTS 7,864,452 B2    1/2011    Ning
2014/0063626 A1*    3/2014    Huang ................... G02B 13/06
                                                                     359/752

\* cited by examiner

*Primary Examiner* — Joseph P Martinez
*Assistant Examiner* — Vipin Patel
(74) *Attorney, Agent, or Firm* — Muncy, Geissler, Olds & Lowe, P.C.

(57) ABSTRACT

A wide angle six-piece lens includes a first lens having a negative refractive power and an image side as a concave surface, a second lens having a positive refractive power and an object side as a convex surface, an aperture, a third lens having a positive refractive power and an image side as a convex surface, a fourth lens having a positive refractive power and an object surface and an image surface as convex surfaces, a fifth lens having a negative refractive power and an object side as a concave surface, and a sixth lens having a positive refractive power and an object side as a convex surface. The overall effective focal length of the wide angle six-piece lens is f, the focal length of the third lens is f3, and an equation 0.29<f/f3<0.36 is satisfied. As such, a wide angle system is formed and aberration is eliminated.

13 Claims, 9 Drawing Sheets

WIDE ANGLE SIX-PIECE LENS

FIELD OF THE INVENTION

The present invention relates to a wide angle lens, and particularly to a wide angle six-piece lens.

BACKGROUND OF THE INVENTION

As technologies progress, portable electronic devices such as smart phones and tablet computers, or monitoring and vehicle devices, are all developed towards trends of being light, compact and small in size. Further, with increasing demands of the users, a lens is usually installed to a portable electronic device to provide the user with a photographing or filming function. A lens provided on such portable electronic device usually features a wide angle characteristic to enhance the effect of close-range shooting, e.g., selfie or document shooting, hence boosting people's desire of purchasing.

For example, the U.S. Pat. No. 7,864,452, "Wide Angle Lens", from an object side to an image side, sequentially includes a first lens group and a second lens group. The first lens group has a negative refractive power, and includes a first lens element, a second lens element, a third lens element and a fourth lens element, where the second lens element is a bi-concave lens element. The second lens group has a positive refractive power, and includes a fifth lens element and a sixth lens element. Thus, the above disclosure provides an advantage of wide angle.

However, when a wide angle lens has a larger viewing angle, correcting the image aberration becomes challenging. Thus, there is a need for a solution that achieves a wide angle while reducing image aberration and enhancing image quality.

SUMMARY OF THE INVENTION

Therefore, it is a primary object of the present invention to solve the issue of large image aberration of a wide angle lens.

To achieve the above object, the present invention provides a wide angle six-piece lens, sequentially including, from an object side to an image side, a first lens, a second lens, an aperture, a third lens, a fourth lens, a fifth lens and a sixth lens. The first lens has a negative refractive power, and includes an image side as a concave surface. The second lens has a positive refractive power, and includes an object side as a convex surface. The third lens has a positive refractive power, and includes an image side as a convex surface. The fourth lens has a positive refractive power, and includes an object side and an image side as convex surfaces. The fifth lens has a negative refractive power, and includes an object side as a concave surface. The sixth lens has a positive refractive power, and includes an object side as a convex surface.

An overall effective focal length of the wide angle six-piece lens is f, a focal length of the third lens is f3, and an equation below is further satisfied:

$$0.29 < f/f3 < 0.36$$

To achieve the above object, the present invention provides a wide angle six-piece lens, sequentially including, from an object side to an image side, a first lens, a second lens, an aperture, a third lens, a fourth lens, a fifth lens and a sixth lens. The first lens has a negative refractive power, and includes an object side having a radius of curvature greater than a radius of curvature of its image side. The second lens has a positive refractive power, and includes an object side having a radius of curvature smaller than a radius of curvature of its image side, wherein the radius of curvature of the object side of the second lens is in a positive value. The third lens has a positive refractive power, and includes an object side having a radius of curvature smaller than a radius of curvature of its image side, wherein the radius of curvature of the object side of the third lens is in a negative value. The fourth lens has a positive refractive power, and includes an object side having a radius of curvature greater than a radius of curvature of its object side, wherein the radius of curvature of the object side of the fourth lens is in a positive value. The fifth lens has a negative refractive power, and includes an object side having a radius of curvature smaller than a radius of curvature of its image side, wherein the radius of curvature of the object side of the fifth lens is in a negative value. The sixth lens has a positive refractive power, and includes an object side having a radius of curvature greater than a radius of curvature of its image side, wherein the radius of curvature of the object side of the sixth lens is in a positive value.

An overall effective focal length of the wide angle six-piece lens is f, a focal length of the third lens is f3, and an equation below is further satisfied:

$$0.29 < f/f3 < 0.36$$

In conclusion, the present invention provides following features.

1. Through the negative refractive power of the first lens, a wide angle system can be easily obtained.
2. Through the positive refractive power of the fourth lens, the negative refractive power of the fifth lens and the positive refractive power of the sixth lens, chromatic aberration can be mitigated.
3. Through the convex surface as the object side of the second lens, a property of small F-number and wide angle can be achieved more easily.
4. By satisfying the equation above, the manufacturing sensitivity can be balanced.

DETAILED DESCRIPTION OF THE PREFERRED EMBODIMENTS

Figure 1:
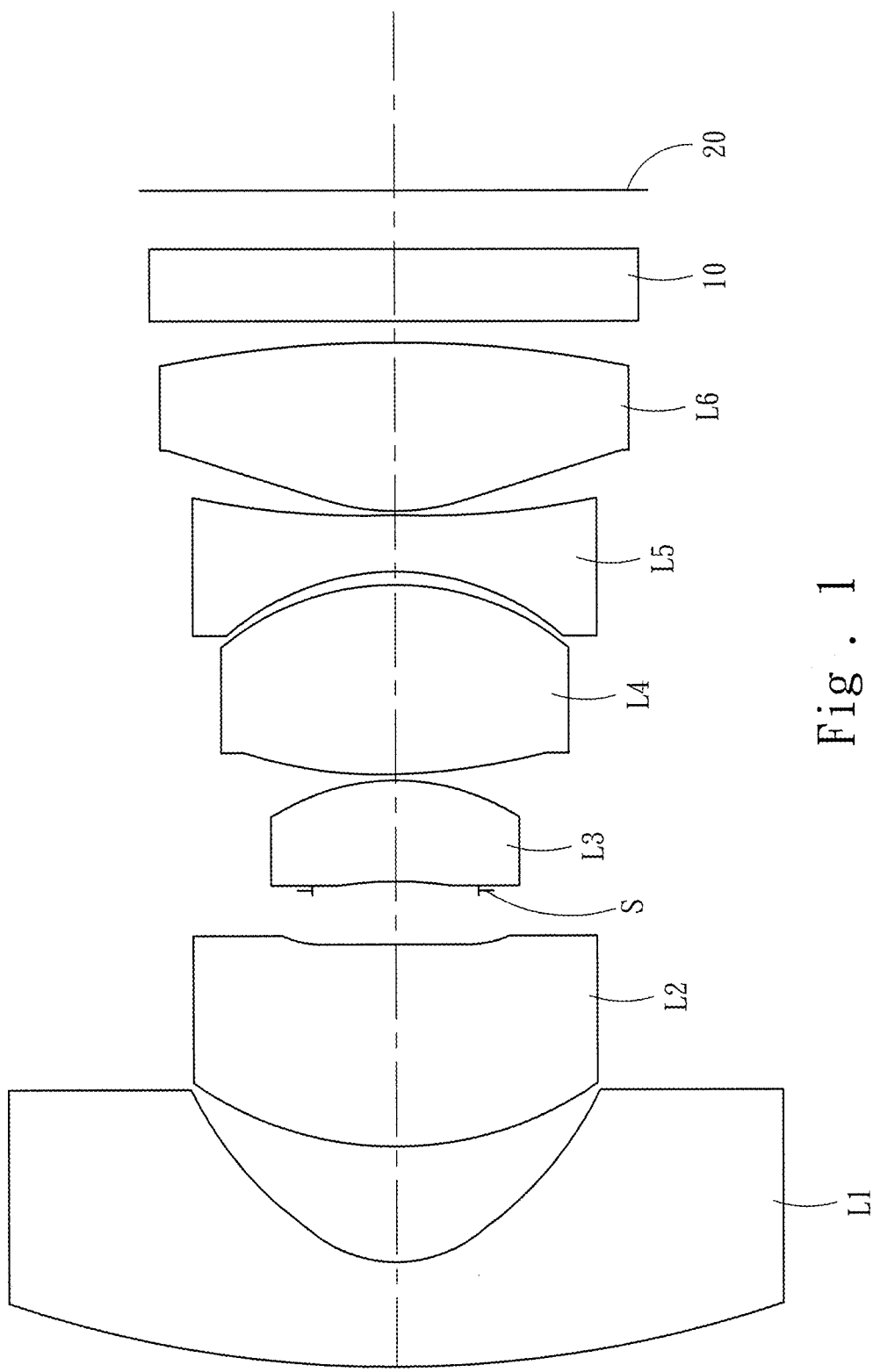
FIG. 1 is a schematic diagram of an optical system according to a first embodiment of the present invention.

Details and technical contents of the present invention are given with the accompanying drawings below.

Referring to FIG. 1 to FIG. 9, the present invention provides a wide angle six-piece lens. The wide angle six-piece lens, from an object side to an image side, sequentially includes a first lens L1 having a negative refractive power, a second lens L2 having a positive refractive power, an aperture S, a third lens L3 having a positive refractive power, a fourth lens L4 having a positive refractive power, a fifth lens L5 having a negative refractive power, and a sixth lens L6 having a positive refractive power. A radius of curvature of an object side of the first lens L1 is greater than a radius of curvature of an image side of the first lens L1. The image side of the first lens L1 is a concave surface. A radius of an object side of the second lens L2 is smaller than a radius of curvature of an image side of the second lens L2, and is in a positive value. The object side of the second lens L2 is a convex surface. A radius of curvature of an object side of the third lens L3 is smaller than a radius of curvature of an image side of the third lens L3, and is in a negative value. The image side of the third lens L3 is a convex surface. Both an object side and an image side of the fourth lens L4 are convex surfaces. A radius of curvature of the object side of the fourth lens L4 is greater than a radius of curvature of the image side of the fourth lens L4, and both are in positive values. A radius of curvature of an object side of the fifth lens L5 is smaller than a radius of curvature of an image side of the firth lens L5, and is in a negative value. The object side of the fifth lens L5 is a concave surface. A radius of curvature of an object side of the sixth lens L6 is greater than a radius of curvature of an image side of the sixth lens L6, and is in a positive value. The object side of the sixth lens L6 is a convex surface. An overall effective focal length of the wide angle six-piece lens is f, a focal length of the third lens L3 is f3, and an equation below is further satisfied:

$$0.29<f/f3<0.36$$

Thus, the manufacturing sensitivity of each piece can be balanced, and hence increasing the yield.

In the present invention, a positive refractive power or a negative refractive power refers to a whether a refractive power on the optical axis of a lens is positive or negative, a face shape of a region of the optical axis may be determined according to general knowledge of the technical field, and a convex or concave surface may be determined according to the value R (the radius of curvature of a paraxial). Taking the object side for instance, it is determined as a convex surface when the value R is positive, or as a concave surface when the value R is negative. Taking the image side for instance, it is determined as a concave surface when the value R is positive, and a convex surface when the value R is negative.

Further, the overall effective focal length of the wide angle six-piece lens is f, a focal length of the fifth L5 is f5, and an equation below is further satisfied:

$$0.68<|f/f5|<0.9$$

When the value |f/f5| is relatively large, it helps correcting the chromatic aberration; when the value |f/f5| is relatively small, it helps reducing the overall length of the system.

The radius of curvature of the image side of the first lens L1 is R2, the radius of curvature of the object side of the second lens L2 is R3, and the first lens L1 and the second lens L2 further satisfy an equation:

$$1.5<R3/R2<4$$

When the value of R3/R2 is relatively large, it helps increasing the brightness; when R3/R2 is relatively small, it helps correcting the astigmatism.

Further, a distance from the object side of the first lens L1 to an imaging surface 20 is D, the focal length of the first lens L1 is f1, and an equation below is further satisfied:

$$4.2<|D/f1|<5.4$$

When the value of |D/f1| is relatively large, it helps correcting the field curvature; when the value of |D/f1| is relatively small, it helps correcting the chromatic aberration.

The abbe number of the fourth lens L4 is V4, the abbe number of the fifth lens L5 is V5, the abbe number of the sixth lens L6 is V6, and an equation below is further satisfied:

$$\frac{(V4+V6)}{2}-V5>25$$

Thus, the chromatic aberration can be corrected better.

The system length of the lens is TTL, the overall effective focal length of the lens is f, and an equation below is further satisfied:

$$6.11 \leq TTL/f \leq 6.64$$

The overall lens thickness of the optical axis of the lens is ATL, the thickness length of the optical axis of the lens is Gaa, and an equation below is further satisfied:

$$3.24 \leq ATL/Gaa \leq 4.13$$

FIG. 1 shows a schematic diagram of an optical system according to a first embodiment of the present invention. From an object side to an image side, the optical system includes a first lens L1, a second lens L2, an aperture S, a third lens L3, a fourth lens L4, a fifth lens L5, a sixth lens L6, a plate glass 10 which may include a filter glass to filter unwanted light and a cover glass to protecting the image sensor and an imaging surface 20. The first lens L1 has a negative refractive power, and includes an object side as a convex surface and an image side as a concave surface. The second lens L2 has a positive refractive power, and includes an object side as a convex surface and an image side as a concave surface. The third lens L3 has a positive refractive power, and includes an object side as a concave surface and an image side as a convex surface. The fourth lens L4 has a positive refractive power, and includes an object side and an image side each as a convex surface. The fifth lens L5 has a negative refractive power, and includes an object side and an image side each as a concave surface. The sixth lens L6 has a positive refractive power, and includes an object side and an image side each as a convex surface. The object side and the image side of the first lens L1 are aspheric surfaces, so as to effectively correct distortion. The object side of the second lens L2 is a convex surface, which helps the system having smaller F-number and wider FOV. The fourth lens L4, the fifth lens L5 and the sixth lens L6 respectively have a positive refractive power, a negative refractive power and a positive refractive power, which are applied with appropriate abbe numbers to achieve an effect of correcting chromatic aberration. Further, the image side of the sixth lens L6 is a convex surface, which effectively lowers a chief ray angle entering a sensor as well as increasing the amount of light for sensing.

Detailed values of this embodiment are as shown in Table-1:

TABLE 1

| Surface | | Radius of curvature (mm) | Thickness (mm) | Refractive index | Abbe number | Focal length (mm) |
|---|---|---|---|---|---|---|
| 0 | Object | Infinity | | | | |
| 1 | First lens | 16.45 | 1.28 | 1.53 | 56.04 | −3.07 |
| 2 | | 1.45 | 1.4 | | | |
| 3 | Second | 3.48 | 2.39 | 1.64 | 23.91 | 6.41 |
| 4 | lens | 16.59 | 0.7 | | | |
| 5 | Aperture | Infinity | 0.1 | | | |
| 6 | Third | −8.38 | 1.19 | 1.53 | 56.04 | 7.36 |
| 7 | lens | −2.81 | 0.09 | | | |
| 8 | Fourth | 5.59 | 2.31 | 1.53 | 56.04 | 3.63 |
| 9 | lens | −2.54 | 0.16 | | | |
| 10 | Fifth lens | −2.28 | 0.68 | 1.65 | 23.53 | −2.91 |
| 11 | | 11.88 | 0.05 | | | |
| 12 | Sixth | 2.58 | 2.06 | 1.54 | 56.07 | 3.99 |
| 13 | lens | −9.18 | 0.2 | | | |
| 14 | Plate glass | Infinity | 0.9 | 1.52 | 64.17 | |
| 15 | | | 0.74 | | | |
| 16 | Imaging plane | Infinity | | | | |

Wherein, the surface 1 is the object side of the first lens L1, the surface 2 is the image side of the first lens L1, the surface 3 is the object side of the second lens L2, the surface 4 is the image side of the second lens L2, the surface 6 is the object side of the third lens L3, the surface 7 is the image side of the third lens L3, the surface 8 is the object side of the fourth lens L4, the surface 9 is the image side of the fourth lens L4, the surface 10 is the object side of the fifth lens L5, the surface 11 is the image side of the fifth lens L5, the surface 12 is the object side of the sixth lens L6, and the surface 13 is the image side of the sixth lens L6. The embodiments of the present invention have the same configuration above, and repeated details shall be omitted.

The thickness of the surface 1 is the distance from the object side of the first lens L1 to the image side of the first lens L1, the thickness of the surface 2 is the distance from the image side of the first lens L1 to the object side of the second lens L2, the thickness of the surface 3 is the distance from the object side of the second lens L2 to the image side of the second lens L2, and so forth. The thickness of the surface 15 is the distance from the image side of the plate glass 10 to the imaging surface 20. The definitions of the thicknesses are identical in the embodiments, and repeated details shall be omitted.

The system length of the wide angle six-piece lens is 14.25 mm, the overall effective focal length is 2.33 mm, the f-number Fno is 2, the field of view FOV is 101 degrees, and the imaging height IMGH is 3 mm.

This embodiment satisfies an equation below:

$0.29 < f/f3 < 0.36$

Thus, balancing manufacturing sensitivity can be promoted. The overall effective focal length of the wide angle six-piece lens is f, the focal length of the third lens L3 is f3, and f/f3=0.317 in this embodiment. Thus, this embodiment achieves an effect of balancing the manufacturing sensitivity.

This embodiment further satisfies an equation below:

$0.63 < |f/f5| < 0.9$

When the value of |f/f5| is relatively large, it helps correcting the chromatic aberration; when the value of |f/f5| is relatively small, it helps reducing the overall system length. The overall effective focal length of the wide angle six-piece lens is f, the focal length of the fifth lens L5 is f5, and |f/f5|=0.801 in this embodiment. Thus, better balance between chromatic aberration correction and miniaturization can be obtained.

Further, the first lens L1 and the second lens L2 further satisfy an equation below:

$1.5 < R3/R2 < 4$

When the value of R3/R2 is relatively large, it helps increasing the brightness; when the value of R3/R2 is relatively small, it helps correcting the astigmatism. The radius of curvature of the image side of the first lens L1 is R2, and the radius of curvature of the object side of the second lens L2 is R3. In this embodiment, R3/R2=2.4, and so better balance between system brightness and astigmatism correction can be obtained.

This embodiment further satisfies an equation below:

$4.2 < |D/f1| < 5.4$

When the value of |D/f1| is relatively large, it helps correcting the field curvature; when the value of |D/f1| is relatively small, it helps correcting the chromatic aberration. The distance from the object side of the first lens L1 to the imaging surface 20 is D, the focal length of the first lens L1 is f1, and |D/f1|=4.642 in this embodiment. Thus, better balance between correcting field curvature and correcting chromatic aberration can be obtained.

This embodiment further satisfies an equation below:

$$\frac{(V4 + V6)}{2} - V5 > 25$$

Thus, correcting chromatic aberration can be promoted. The abbe number of the fourth lens L4 is V4, the abbe number of the fifth lens L5 is V5, the abbe number of the sixth lens L6 is V6, and $$\frac{(V4 + V6)}{2} - V5 = 32/525.$$

Thus, chromatic aberration can be effectively corrected.

This embodiment further satisfies an equation below:

$6.11 \leq TTL/f \leq 6.64$

The system length of the wide angle six-piece lens is TTL, the overall effective focal length of the wide angle six-piece lens is f, and TTL/f=6.12 in this embodiment.

Further, this embodiment satisfies an equation below:

$3.24 \leq ATL/Gaa \leq 4.13$

The overall lens thickness of the wide angle six-piece lens is ATL, the thickness length of the optical axis of the wide angle six-piece lens is Gaa, and ATL/Gaa=4.13 in this embodiment.

Figure 2:
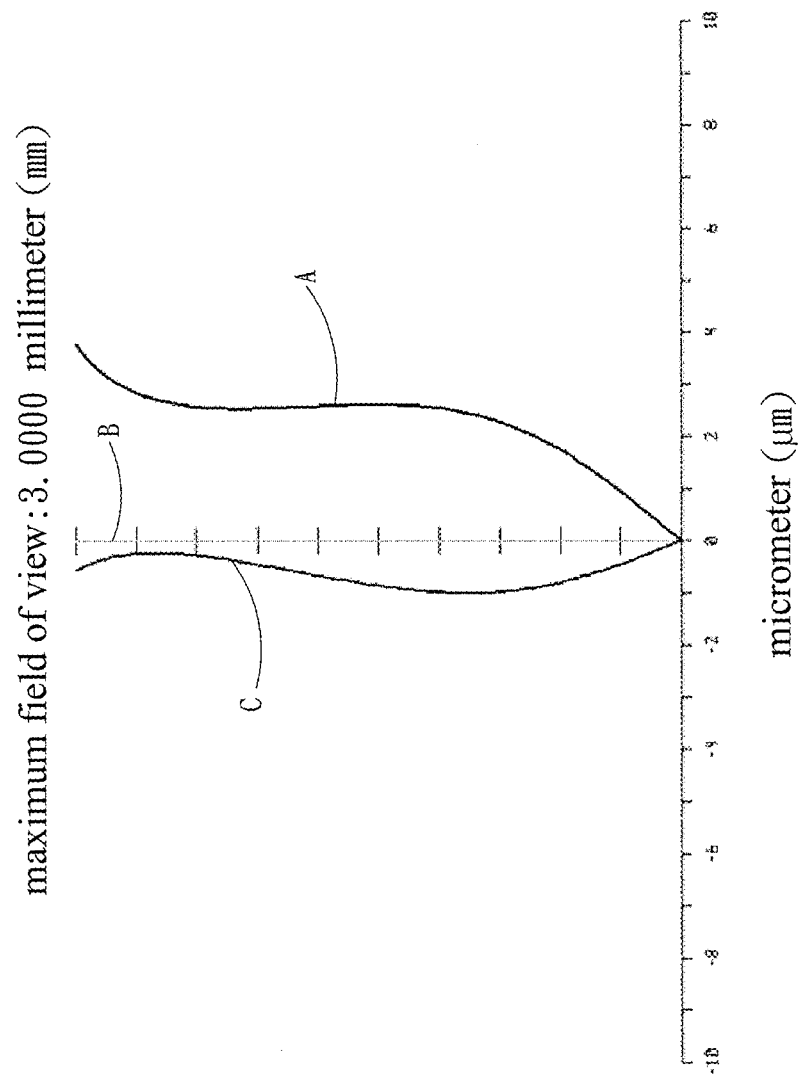
FIG. 2 is a diagram of chromatic aberration according to the first embodiment of the present invention.
Figure 3:
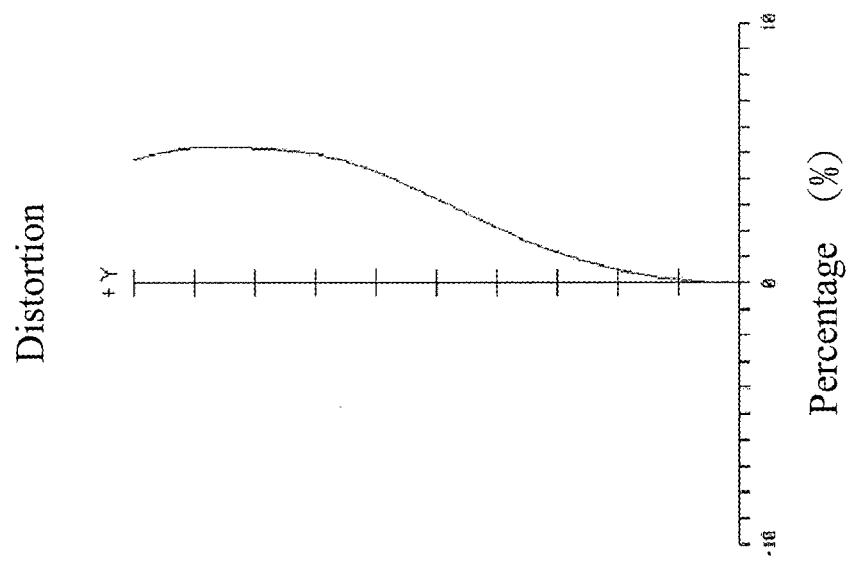
FIG. 3 is a schematic diagram of distortion according to the first embodiment of the present invention.

FIG. 2 and FIG. 3 show diagrams of chromatic aberration and distortion according to the first embodiment of the present invention, respectively. Referring to FIG. 2, the segment A, the segment B and the segment C respectively illustrate later color aberration values that light beams having wavelengths of 0.488 μm, 0.546 m and 0.6 μm generate at a field height between 0 mm and 3 mm. Thus, it is known that, the later color aberration value generated in this embodiment is smaller than 4.5 μm. It is further seen from FIG. 3 that, the distortion generated in this embodiment is smaller than 5.5%. Therefore, both chromatic aberration and distortion can be effectively corrected in this embodiment to provide good image quality.

The first lens L1, the second lens L2, the third lens L3, the fourth lens L4, the fifth lens L5 and the sixth lens L6 may be made of glass and/or plastic. The plastic material provides an advantage of having reduced production costs, whereas the glass material features advantages of having high temperature endurance, scratch resistant and high transmission. When the first lens L1, the second lens L2, the third lens L3, the fourth lens L4, the fifth lens L5 and the sixth lens L6 are aspheric, and are made of plastic or glass, the surface sag is given by $$z = \frac{ch^2}{1 + [1 - (k+1)c^2h^2]^{\frac{1}{2}}} + Ah^2 + Bh^4 + Ch^6 + Dh^8 + Eh^{10} + Fh^{12} + Gh^{14} + Hh^{16}$$

In the above equation, $c=1/r$, r is the radius of curvature of a surface, h is the height of this surface, k is a conic constant, A is a second-order coefficient, B is a fourth-order coefficient, C is a sixth-order coefficient, D is an eighth-order coefficient, E is a tenth-order coefficient, F is a twelfth-order coefficient, G is a fourteenth-order coefficient, and H is a sixteenth-order coefficient.

In this embodiment, respective aspheric parameters of the first lens L1, the second lens L2, the third lens L3, the fourth lens L4, the fifth lens L5 and the sixth lens L6 are as shown in Table-2:

TABLE 2

|   | Surface 1 | Surface 2 | Surface 3 | Surface 4 | Surface 6 | Surface 7 |
|---|---|---|---|---|---|---|
| k | 0 | −0.942378 | −0.869166 | 0 | 0 | −0.041512 |
| A | 0 | 0 | 0 | 0 | 0 | 0 |
| B | 0.000195 | 0.003885 | −0.002115 | 0.010043 | 0.004522 | −0.002901 |
| C | 0.000003 | −0.003355 | −0.00022 | 0.003755 | 0.001301 | −0.000585 |
| D | 0 | 0.001423 | −0.000216 | 0.002398 | 0.000316 | −0.000087 |
| E | 0 | −0.000293 | 0.000251 | −0.001077 | −0.000139 | −0.000016 |
| F | 0 | 0.000038 | −0.000079 | 0.00022 | −0.000114 | −0.000004 |
| G | 0 | −0.000004 | 0.00001 | 0.000018 | −0.000014 | 0.000003 |
| H | 0 | 0 | −0.000001 | 0.000034 | 0.000102 | 0.000004 |

|   | Surface 8 | Surface 9 | Surface 10 | Surface 11 | Surface 12 | Surface 13 |
|---|---|---|---|---|---|---|
| k | 0 | −0.012869 | 0 | 0 | −0.700912 | 0 |
| A | 0 | 0 | 0 | 0 | 0 | 0 |
| B | −0.001189 | 0.009108 | 0.025731 | −0.000504 | −0.042907 | 0.005763 |
| C | −0.002447 | −0.000235 | 0.001961 | 0.000017 | 0.011496 | −0.001679 |
| D | 0.001606 | 0.00083 | −0.001121 | −0.000006 | −0.002729 | 0.000014 |
| E | −0.000439 | −0.000168 | −0.000406 | −0.000001 | 0.000479 | 0.000099 |
| F | −0.000018 | −0.000008 | 0.000289 | 0 | −0.000055 | −0.000021 |
| G | 0.000025 | 0.000008 | −0.000044 | 0 | 0.000004 | 0.000002 |
| H | −0.000002 | −0.000001 | 0.000002 | 0 | 0 | 0 |

Figure 4:
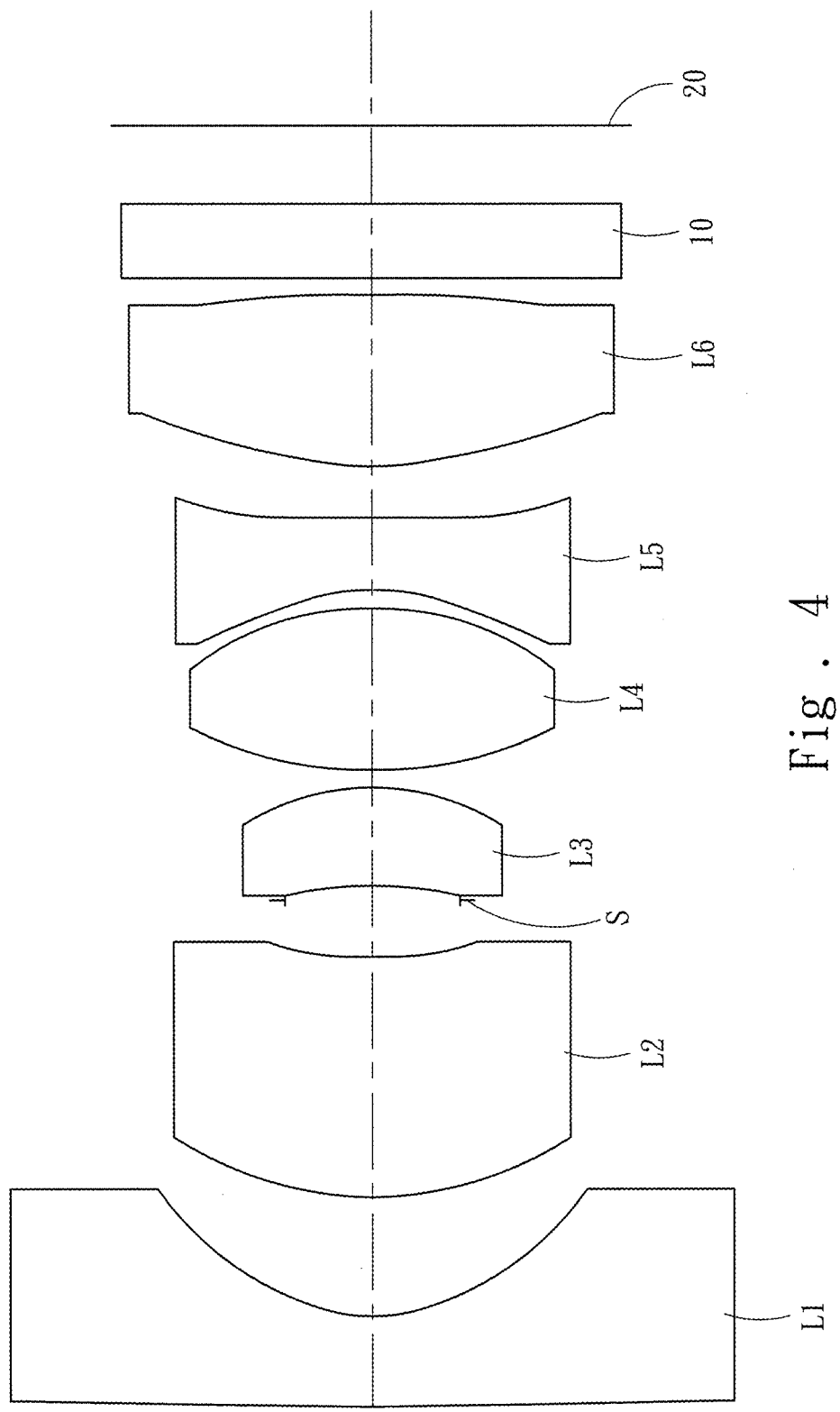
FIG. 4 is a schematic diagram according to a second embodiment of the present invention.

Referring to FIG. 4 showing an optical system according to a second embodiment of the present invention, from an object side to an image side, the optical system sequentially includes a first lens L1, a second lens L2, an aperture S, a third lens L3, a fourth lens L4, a fifth lens L5, a sixth lens L6, a plate glass 10 and an imaging surface 20. The first lens L1 has a negative refractive power. An object side of the first lens L1 is a convex surface, and an image side of the first lens L 1 is a concave surface. The second lens L2 has a positive refractive power. An object side of the second lens L2 is a convex surface and an image side of the second lens L2 is a concave surface. The third lens L3 has a positive refractive power. An object side of the third lens L3 is a concave surface, and an image side of the third lens L3 is a convex surface. The fourth lens L4 has a positive refractive power. An object side and an image side of the fourth lens L4 are both convex surfaces. The fifth lens L5 has a negative refractive power. An object side and an image side of the fifth lens L5 are both concave surfaces. The sixth lens L6 has a positive refractive power. An object side and an image side of the sixth lens L6 are both convex surfaces.

The object side and the image side of the first lens L1 are both aspheric, and so distortion can be effectively corrected. The object side of the second lens L2 is a convex surface, which helps achieving effects of a large aperture and a wide angle. The fourth lens L4, the fifth lens L5 and the sixth lens L6 have a positive refractive power, a negative refractive power and a positive refractive power, respectively, which are applied with appropriate abbe numbers. Thus, an incident angle of a main light beam entering a sensor can be reduced while the amount of light for sensing can be increased.

Detailed values of this embodiment are as shown in Table-3:

TABLE 3

| Surface | | Radius of curvature (mm) | Thickness (mm) | Index of refraction | Abbe number | Focal length (mm) |
|---|---|---|---|---|---|---|
| 0 | Object | Infinity | | | | |
| 1 | First lens | 67.13 | 1.11 | 1.53 | 56.04 | −3.54 |
| 2 | | 1.83 | 1.46 | | | |

TABLE 3-continued

| Surface | | Radius of curvature (mm) | Thickness (mm) | Index of refraction | Abbe number | Focal length (mm) |
|---|---|---|---|---|---|---|
| 3 | Second | 3.57 | 2.94 | 1.65 | 23.53 | 9.63 |
| 4 | lens | 5.66 | 0.7 | | | |
| 5 | Aperture | infinity | 0.17 | | | |
| 6 | Third | −4.77 | 1.2 | 1.73 | 54.68 | 7.1 |
| 7 | lens | −2.75 | 0.23 | | | |
| 8 | Fourth | 4.3 | 2 | 1.54 | 56.07 | 4.02 |

TABLE 3-continued

| Surface | | Radius of curvature (mm) | Thickness (mm) | Index of refraction | Abbe number | Focal length (mm) |
|---|---|---|---|---|---|---|
| 9 | lens | −3.63 | 0.2 | | | |
| 10 | Fifth lens | −2.3 | 0.89 | 1.64 | 23.91 | −3.33 |
| 11 | | 35.55 | 0.59 | | | |
| 12 | Sixth | 2.62 | 2.17 | 1.55 | 55.91 | 4.05 |
| 13 | lens | −10.16 | 0.2 | | | |
| 14 | Plate glass | Infinity | 0.9 | 1.52 | 64.17 | |
| 15 | | | 0.99 | | | |
| 16 | Imaging surface | Infinity | | | | |

The system length of the wide angle six-piece lens is 15.75 mm, the overall effective focal length is 2.38 mm, the aperture value Fno is 2, the field of view FOV is 105 degrees, and the imaging height IMGH is 3 mm.

This embodiment satisfies an equation below:

$$0.29 < f/f3 < 0.36$$

Thus, balancing manufacturing sensitivity can be promoted. The overall focal length of the wide angle six-piece lens is f, the focal length of the third lens L3 is f3, and f/f3=0.335 in this embodiment. Thus, this embodiment achieves an effect of balancing manufacturing sensitivity.

This embodiment further satisfies an equation below:

$$0.68 < |f/f5| < 0.9$$

When the value of $|f/f5|$ is relatively large, it helps correcting the chromatic aberration; when the value of $|f/f5|$ is relatively small, it helps reducing the overall system length. The overall effective focal length of the wide angle six-piece lens is f, the focal length of the fifth lens L5 is f5, and $|f/f5|$=0.715 in this embodiment. Thus, better balance between chromatic aberration correction and miniaturization can be obtained.

Further, the first lens L1 and the second lens L2 in this embodiment further satisfy an equation below:

$$1.5 < R3/R2 < 4$$

When the value of R3/R2 is relatively large, it helps increasing the brightness; when the value of R3/R2 is relatively small, it helps correcting the astigmatism. The radius of curvature of the image side of the first lens L1 is R2, and the radius of curvature of the object side of the second lens L2 is R3. In this embodiment, R3/R2=1.915, and so better balance between system brightness and astigmatism correction can be obtained.

This embodiment further satisfies an equation below:

$$4.2 < |D/f1| < 5.4$$

When the value of $|D/f1|$ is relatively large, it helps correcting the field curvature; when the value of $|D/f1|$ is relatively small, it helps correcting the chromatic aberration. The distance from the object side of the first lens L1 to the imaging surface 20 is D, the focal length of the first lens L1 is f1, and $|D/f1|$=4.449 in this embodiment. Thus, better balance between field curvature correction and chromatic aberration correction can be obtained.

This embodiment further satisfies an equation below:

$$\frac{(V4+V6)}{2} - V5 > 25$$

Thus, correcting chromatic aberration can be promoted. The abbe number of the fourth lens L4 is V4, the abbe number of the fifth lens L5 is V5, the abbe number of the sixth lens L6 is V6, and $$\frac{(V4+V6)}{2} - V5 = 32.08$$

in this embodiment, and so chromatic aberration can be effectively corrected.

This embodiment further satisfies an equation below:

$$6.11 \leq TTL/f \leq 6.64$$

The system length of the wide angle six-piece lens is TTL, the overall effective focal length of the wide angle six-piece lens is f, and TT/f=6.62 in this embodiment.

Further, this embodiment satisfies an equation below:

$$3.24 \leq ATL/Gaa \leq 4.13$$

The overall lens thickness of the wide angle six-piece lens is ATL, the thickness length of the optical axis of the lens is Gaa, and ATL/Gaa=3.24 in this embodiment.

Figure 5:
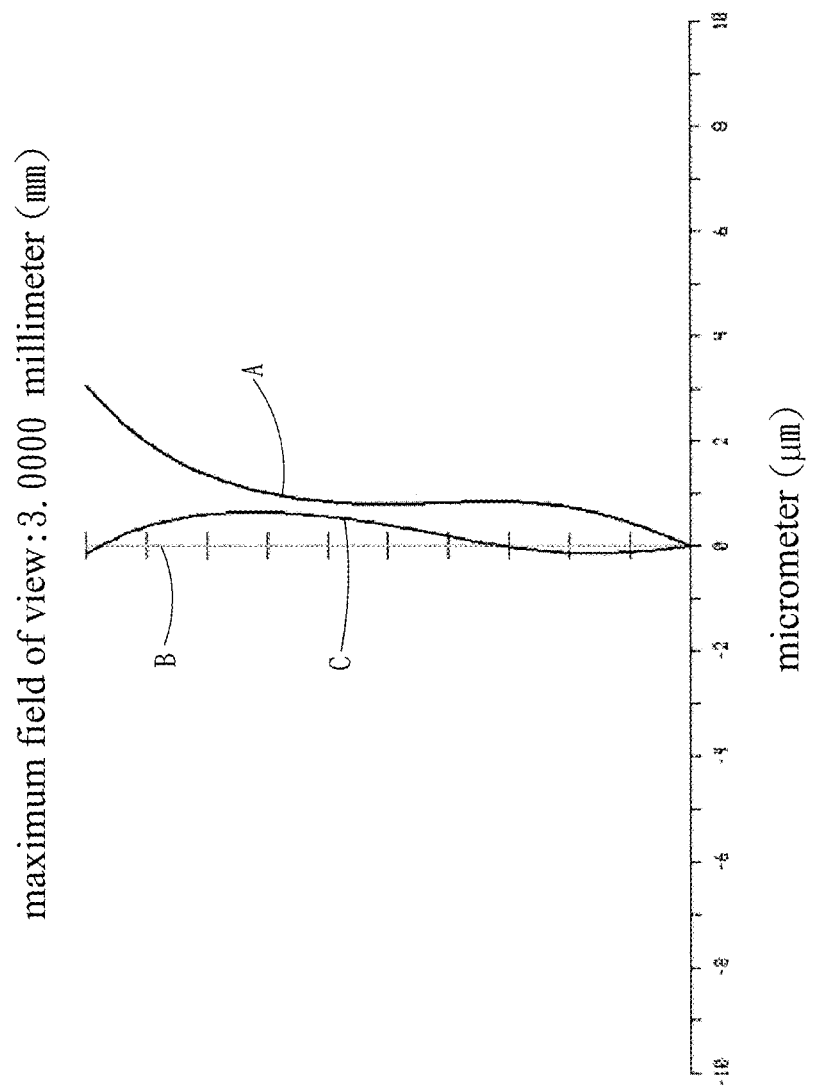
FIG. 5 is diagram of chromatic aberration according to the second embodiment of the present invention.
Figure 6:
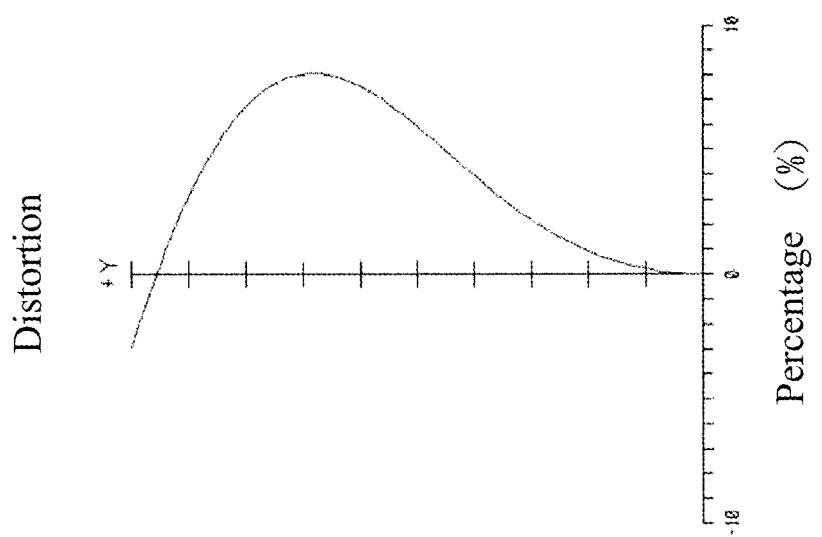
FIG. 6 is a schematic diagram of distortion according to the second embodiment of the present invention.

FIG. 5 and FIG. 6 are diagrams of chromatic aberration and distortion according to the second embodiment of the present invention, respectively. In FIG. 5, the segment A, the segment B and the segment C respectively illustrate the later color aberration values that light beams having wavelengths of 0.488 μm, 0.546 μm and 0.6 μm generate at a field height between 0 mm and 3 mm. It is known that, the later color aberration generated in this embodiment is smaller than 3.5 μm. It is further seen from FIG. 6 that, the distortion generated in this embodiment is smaller than 8.5%. Therefore, both chromatic aberration and distortion can be effectively corrected in this embodiment to provide good image quality.

The first lens L1, the second lens L2, the third lens L3, the fourth lens L4, the fifth lens L5 and the sixth lens L6 may be made of glass and/or plastic. The plastic material provides an advantage of having reduced production costs, whereas the glass material features advantages of being high-heat resistant and wear resistant as well as having better penetration. When the first lens L1, the second lens L2, the third lens L3, the fourth lens L4, the fifth lens L5 and the sixth lens L6 are aspheric, and are made of plastic or glass, a aspheric equation below is satisfied:

$$z = \frac{ch^2}{1+\lfloor 1-(k+1)c^2h^2 \rfloor_2^{\frac{1}{2}}} + Ah^2 + Bh^4 + Ch^6 + Dh^8 + Eh^{10} + Fh^{12} + Gh^{14} + Hh^{16}$$

In the above equation, c=1/r, r is the radius of curvature of a surface, h is the height of light beams on this surface, k is a conic constant, A is a second-order coefficient, B is a fourth-order coefficient, C is a sixth-order coefficient, D is an eighth-order coefficient, E is a tenth-order coefficient, F is a twelfth-order coefficient, G is a fourteenth-order coefficient, and H is a sixteenth-order coefficient.

In this embodiment, respective aspheric parameters of the first lens L1, the second lens L2, the third lens L3, the fourth lens L4, the fifth lens L5 and the sixth lens L6 are as shown in Table-4:

TABLE 4

| | Surface 1 | Surface 2 | Surface 3 | Surface 4 | Surface 6 | Surface 7 |
|---|---|---|---|---|---|---|
| k | 0 | −1.537555 | −3.388972 | 0 | 0 | 0 |
| A | 0 | 0 | 0 | 0 | 0 | 0 |
| B | −0.001875 | −0.003022 | 0.00034 | 0.014035 | 0 | 0 |
| C | 0.000161 | −0.001619 | 0.000931 | −0.003401 | 0 | 0 |
| D | −0.000003 | 0.00091 | −0.000794 | 0.010292 | 0 | 0 |
| E | 0 | −0.000233 | 0.000348 | −0.006018 | 0 | 0 |
| F | 0 | 0.000045 | −0.000068 | 0.000628 | 0 | 0 |
| G | 0 | −0.000005 | 0.000007 | 0.001047 | 0 | 0 |
| H | 0 | 0 | 0 | −0.000343 | 0 | 0 |

| | Surface 8 | Surface 9 | Surface 10 | Surface 11 | Surface 12 | Surface 13 |
|---|---|---|---|---|---|---|
| k | 0 | 0 | −0.001328 | 0 | −0.557111 | 0 |
| A | 0 | 0 | 0 | 0 | 0 | 0 |
| B | −0.003719 | −0.011477 | 0.030887 | −0.024674 | −0.052311 | 0.004713 |
| C | −0.001895 | 0.000397 | 0.002649 | 0.022863 | 0.014177 | 0.000011 |
| D | 0.001076 | 0.000627 | −0.00069 | −0.006624 | −0.003025 | 0 |
| E | −0.00023 | −0.000099 | −0.000491 | 0.000967 | 0.000485 | 0 |
| F | −0.00002 | −0.000007 | 0.00026 | −0.000083 | −0.000055 | 0 |
| G | 0.000014 | 0.000002 | −0.000042 | 0.000006 | 0.000004 | 0 |
| H | −0.000001 | 0 | 0.000003 | 0 | 0 | 0 |

Figure 7:
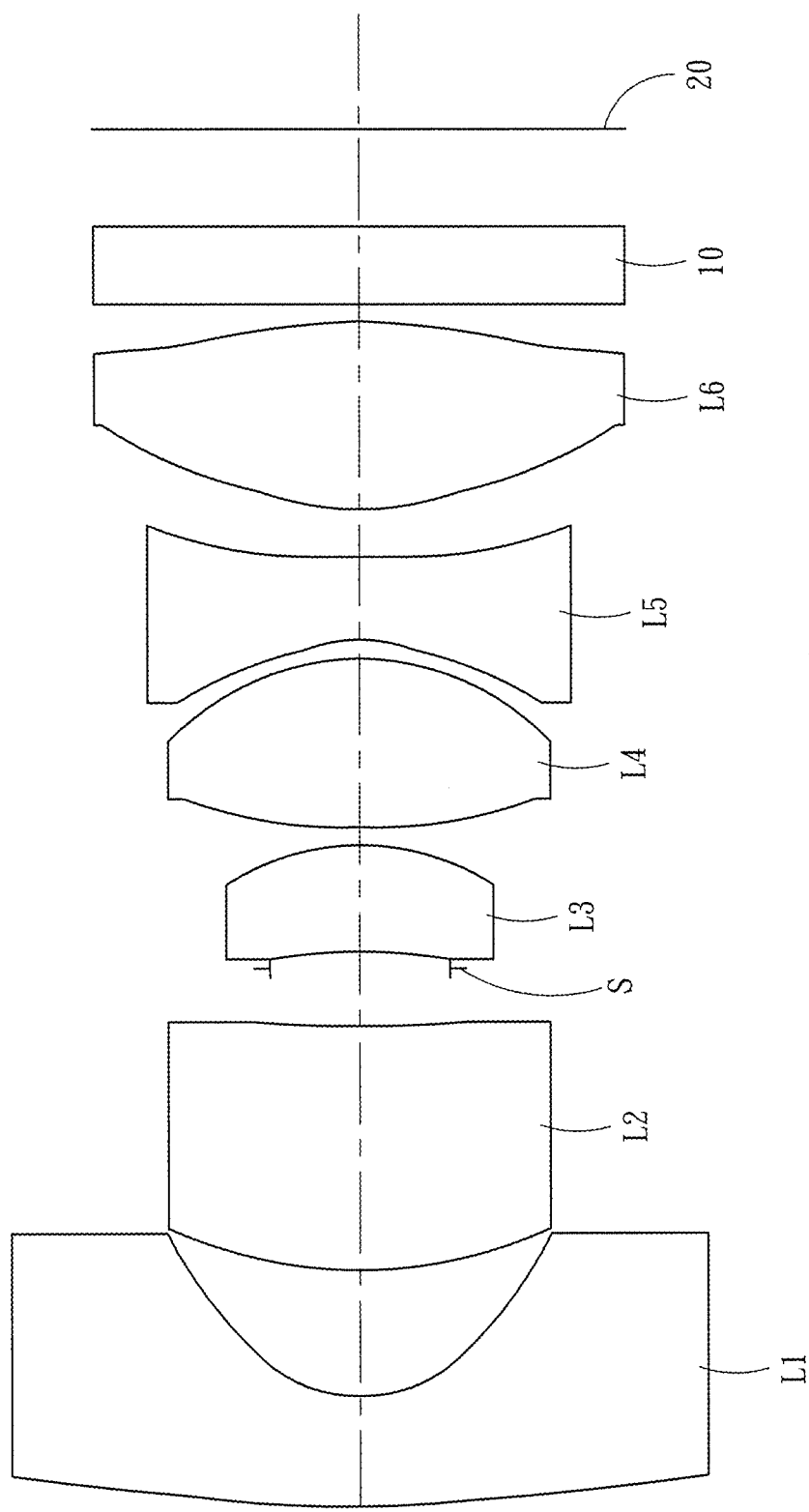
FIG. 7 is a schematic diagram according to a third embodiment of the present invention.

Referring to FIG. 7 showing an optical system according to a third embodiment of the present invention, from an object side to an image side, the optical system sequentially includes a first lens L1, a second lens L2, an aperture S, a third lens L3, a fourth lens L4, a fifth lens L5, a sixth lens L6, a plate glass 10 and an imaging surface 20. The first lens L1 has a negative refractive power. An object side of the first lens L1 is a convex surface, and an image side of the first lens L1 is a concave surface. The second lens L2 has a positive refractive power. An object side of the second lens L2 is a convex surface and an image side of the second lens L2 is a concave surface. The third lens L3 has a positive refractive power. An object side of the third lens L3 is a concave surface, and an image side of the third lens L3 is a convex surface. The fourth lens L4 has a positive refractive power. An object side and an image side of the fourth lens L4 are both convex surfaces. The fifth lens L5 has a negative refractive power. An object side and an image side of the fifth lens L5 are both concave surfaces. The sixth lens L6 has a positive refractive power. An object side and an image side of the sixth lens L6 are both convex surfaces. The object side and the image side of the first lens L1 are both aspheric, and so distortion can be effectively corrected. The image side of the second lens L2 is a convex surface, which helps achieving effects of a large aperture and a wide angle. The fourth lens L4, the fifth lens L5 and the sixth lens L6 have a positive refractive power, a negative refractive power and a positive refractive power, respectively, which are applied with appropriate abbe numbers. Thus, an incident angle of a main light beam entering a sensor can be reduced while the amount of light for sensing can be increased.

Detailed values of this embodiment are as shown in Table-5:

TABLE 5

| Surface | | Radius of curvature (mm) | Thickness (mm) | Index of refraction | Abbe number | Focal length (mm) |
|---|---|---|---|---|---|---|
| 0 | Object | 14.79 | 1.29 | | | |
| 1 | First lens | 1.46 | 1.45 | 1.53 | 56.04 | −3.15 |
| 2 | | 5.06 | 2.82 | | | |
| 3 | Second | 14.53 | 0.68 | 1.84 | 37.16 | 8.15 |
| 4 | lens | infinity | 0.2 | | | |
| 5 | Aperture | −7.12 | 1.21 | | | |
| 6 | Third | −2.7 | 0.2 | 1.53 | 56.04 | 7.45 |
| 7 | lens | 5.79 | 1.97 | | | |
| 8 | Fourth | −2.64 | 0.21 | 1.53 | 56.04 | 3.7 |
| 9 | lens | −2.27 | 0.96 | | | |
| 10 | Fifth lens | 10.41 | 0.57 | 1.64 | 23.91 | −2.82 |
| 11 | | 2.66 | 2.18 | | | |
| 12 | Sixth | −6.64 | 0.2 | 1.53 | 56.04 | 3.88 |
| 13 | lens | Infinity | 0.9 | | | |
| 14 | Plate glass | | 1.15 | 1.52 | 64.17 | |
| 15 | | Infinity | | | | |
| 16 | Imaging surface | Infinity | | | | |

The system length of the wide angle six-piece lens is 15.99 mm, the overall effective focal length is 2.41 mm, the aperture value Fno is 2, the field of view FOV is 104 degrees, and the imaging height IMGH is 3 mm.

This embodiment satisfies an equation below:

$$0.29 < f/f3 < 0.36$$

Thus, balancing manufacturing sensitivity can be promoted. The overall focal length of the wide angle six-piece lens is f, the focal length of the third lens L3 is f3, and f/f3=0.323 in this embodiment. Thus, this embodiment achieves an effect of balancing manufacturing sensitivity.

This embodiment further satisfies an equation below:

$$0.68 < |f/f5| < 0.9$$

When the value of |f/f5| is relatively large, it helps correcting the chromatic aberration; when the value of |f/f5| is relatively small, it helps reducing the overall system length. The overall effective focal length of the wide angle six-piece lens is f, the focal length of the fifth lens L5 is f5, and |f/f5|=0.855 in this embodiment. Thus, better balance between chromatic aberration correction and miniaturization can be obtained.

Further, the first lens L1 and the second lens L2 in this embodiment further satisfy an equation below:

$$1.5 < R3/R2 < 4$$

When the value of R3/R2 is relatively large, it helps increasing the brightness; when the value of R3/R2 is relatively small, it helps correcting the astigmatism. The radius of curvature of the image side of the first lens L1 is R2, and the radius of curvature of the object side of the second lens L2 is R3. In this embodiment, R3/R2=3.466, and so better balance between system brightness and astigmatism correction can be obtained.

This embodiment further satisfies an equation below:

$$4.2<|D/f1|<5.4$$

When the value of |D/f1| is relatively large, it helps correcting the field curvature; when the value of |D/f1| is relatively small, it helps correcting the chromatic aberration. The distance from the object side of the first lens L1 to the imaging surface 20 is D, the focal length of the first lens L1 is f1, and |D/f1|=5.076 in this embodiment. Thus, better balance between field curvature correction and chromatic aberration correction can be obtained.

This embodiment further satisfies an equation below:

$$\frac{(V4+V6)}{2}-V5>25$$

Thus, correcting chromatic aberration can be promoted. The abbe number of the fourth lens L4 is V4, the abbe number of the fifth lens L5 is V5, the abbe number of the sixth lens L6 is V6, and $$\frac{(V4+V6)}{2}-V5=32.13$$

in this embodiment, and so chromatic aberration can be effectively corrected.

This embodiment further satisfies an equation below:

$$6.11 \leq TTL/f \leq 6.64$$

The system length of the wide angle six-piece lens is TTL, the overall effective focal length of the wide angle six-piece lens is f, and TT/f=6.63 in this embodiment.

This embodiment satisfies an equation below:

$$3.24 \leq ATL/Gaa \leq 4.13$$

The overall lens thickness of the wide angle six-piece lens is ATL, the thickness length of the optical axis of the lens is Gaa, and ATL/Gaa=3.35 in this embodiment.

Figure 8:
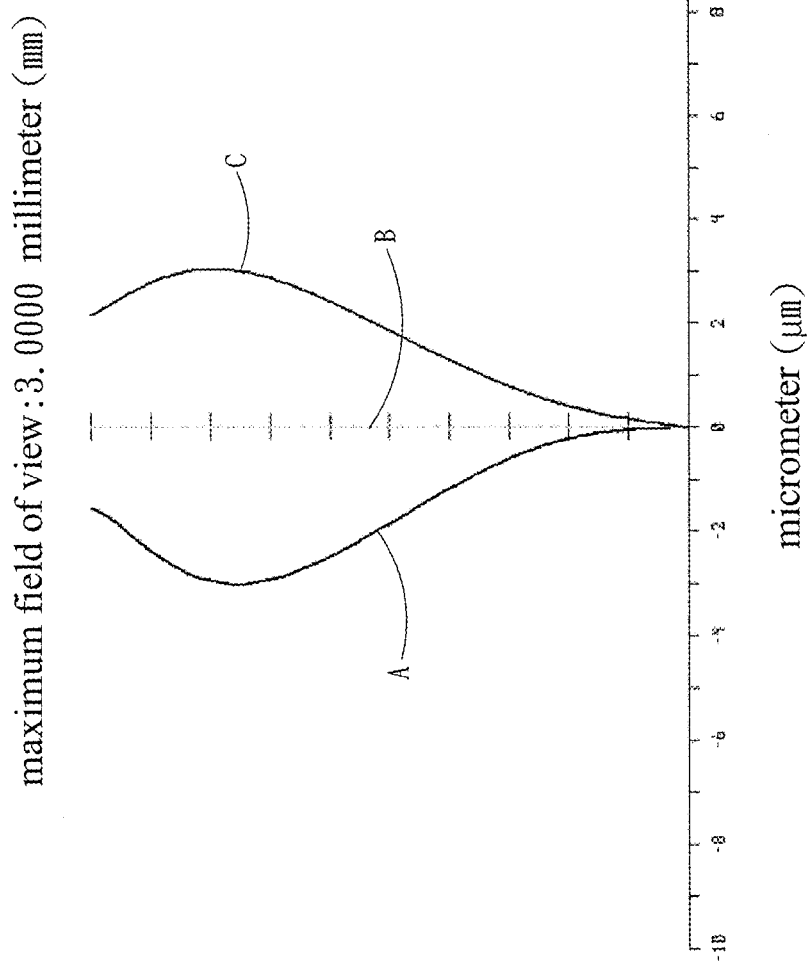
FIG. 8 is diagram of chromatic aberration according to the third embodiment of the present invention.
Figure 9:
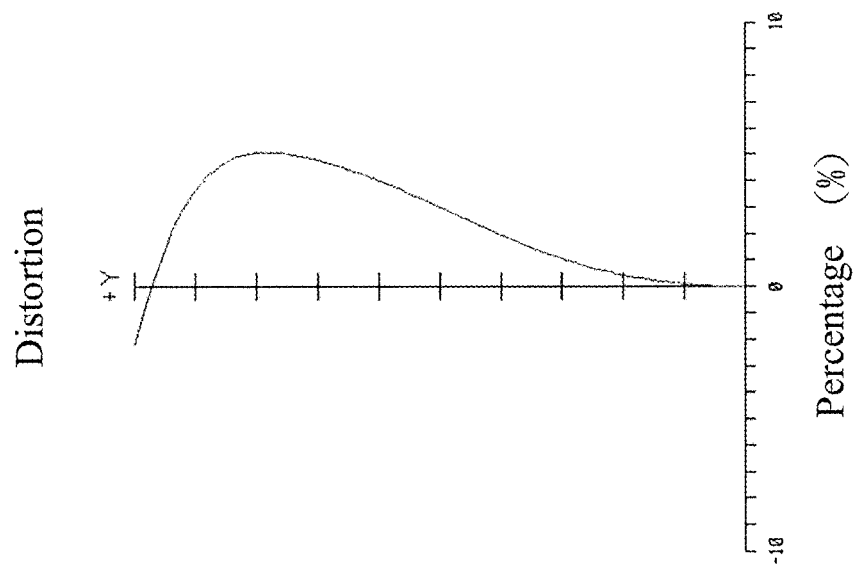
FIG. 9 is a schematic diagram of distortion according to the third embodiment of the present invention

FIG. 8 and FIG. 9 are diagrams of chromatic aberration and distortion according to the second embodiment of the present invention, respectively. In FIG. 8, the segment A, the segment B and the segment C respectively illustrate the later color aberration values that light beams having wavelengths of 0.488 μm, 0.546 μm and 0.6 μm generate at a field height between 0 mm and 3 mm. It is known that, the later color aberration generated in this embodiment is smaller than 6.5 μm. It is further seen from FIG. 9 that, the distortion generated in this embodiment is smaller than 5%. Therefore, both chromatic aberration and distortion can be effectively corrected in this embodiment to provide good image quality.

The first lens L1, the second lens L2, the third lens L3, the fourth lens L4, the fifth lens L5 and the sixth lens L6 may be made of glass and/or plastic. The plastic material provides an advantage of having reduced production costs, whereas the glass material features advantages of being high-heat resistant and wear-resistant as well as having better penetration. When the first lens L1, the second lens L2, the third lens L3, the fourth lens L4, the fifth lens L5 and the sixth lens L6 are aspheric, and are made of plastic or glass, a aspheric equation below is satisfied:

$$z=\frac{ch^2}{1+[1-(k+1)c^2h^2]^{\frac{1}{2}}}+Ah^2+Bh^4+Ch^6+Dh^8+Eh^{10}+Fh^{12}+Gh^{14}+Hh^{16}$$

In the above equation, c=1/r, r is the radius of curvature of a surface, h is the height of light beams on this surface, k is a conic constant, A is a second-order coefficient, B is a fourth-order coefficient, C is a sixth-order coefficient, D is an eighth-order coefficient, E is a tenth-order coefficient, F is a twelfth-order coefficient, G is a fourteenth-order coefficient, and H is a sixteenth-order coefficient.

In this embodiment, respective aspheric parameters of the first lens L1, the second lens L2, the third lens L3, the fourth lens L4, the fifth lens L5 and the sixth lens L6 are as shown in Table-6:

TABLE 6

|   | Surface 1 | Surface 2 | Surface 3 | Surface 4 | Surface 6 | Surface 7 |
|---|---|---|---|---|---|---|
| k | 0 | −1.030076 | 0 | 0 | 0 | −0.125807 |
| A | 0 | 0 | 0 | 0 | 0 | 0 |
| B | −0.000439 | 0.012142 | 0 | 0 | −0.010059 | −0.0002 |
| C | −0.000011 | −0.002195 | 0 | 0 | −0.000713 | 0.001651 |
| D | 0 | 0.001363 | 0 | 0 | 0.000422 | 0.000119 |
| E | 0 | −0.000301 | 0 | 0 | 0.000148 | −0.000006 |
| F | 0 | 0.000035 | 0 | 0 | 0.000144 | −0.000001 |
| G | 0 | −0.000004 | 0 | 0 | −0.000032 | −0.000002 |
| H | 0 | 0 | 0 | 0 | −0.000178 | −0.000002 |

|   | Surface 8 | Surface 9 | Surface 10 | Surface 11 | Surface 12 | Surface 13 |
|---|---|---|---|---|---|---|
| k | 0 | 0 | 0.001411 | 0 | −0.637854 | 0 |
| A | 0 | 0 | 0 | 0 | 0 | 0 |
| B | 0.000293 | 0.005405 | 0.028859 | −0.025384 | −0.041498 | 0.00653 |
| C | −0.002209 | −0.001322 | 0.003159 | 0.019751 | 0.01151 | −0.001352 |
| D | 0.00156 | 0.000776 | −0.001072 | −0.006208 | −0.002682 | 0.000025 |
| E | −0.000433 | −0.000148 | −0.000419 | 0.001048 | 0.000468 | 0.000098 |
| F | −0.000017 | −0.000005 | 0.000276 | −0.000089 | −0.000054 | −0.000021 |
| G | 0.000024 | 0.000008 | −0.000043 | 0.000003 | 0.000004 | 0.000002 |
| H | −0.000003 | −0.000001 | 0.000002 | 0 | 0 | 0 |

The values below are calculated from the first embodiment to the third embodiment of the present invention:

TABLE 7

| Value | First embodiment | Second embodiment | Third embodiment | Value range |
|---|---|---|---|---|
| f/R1 | 0.15 | 0.04 | 0.16 | 0.03≤f/R1≤0.17 |
| f/R2 | 1.61 | 1.30 | 1.65 | 1.3≤f/R2≤1.66 |
| f/R3 | 0.67 | 0.67 | 0.48 | 0.47≤f/R3≤0.67 |
| f/R4 | 0.14 | 0.42 | 0.17 | 0.14≤f/R4≤0.43 |
| f/R5 | −0.28 | −0.50 | −0.34 | −0.49≤f/R5≤−0.28 |
| f/R6 | −0.83 | −0.87 | −0.89 | −0.89≤f/R6≤−0.83 |
| f/R7 | 0.42 | 0.55 | 0.42 | 0.41≤f/R7≤0.56 |
| f/R8 | −0.92 | −0.66 | −0.91 | −0.91≤f/R8≤−0.66 |
| f/R9 | −1.02 | −1.03 | −1.06 | −1.06≤f/R9≤−1.03 |
| f/R10 | 0.20 | 0.07 | 0.23 | 0.06≤f/R10≤0.24 |
| f/R11 | 0.90 | 0.91 | 0.91 | 0.9≤f/R11≤0.91 |
| f/R12 | −0.25 | −0.23 | −0.36 | −0.36≤f/R12≤−0.24 |
| f/f1 | −0.76 | −0.67 | −0.77 | −0.76≤f/f1≤−0.68 |
| f/f2 | 0.36 | 0.25 | 0.30 | 0.24≤f/f2≤0.37 |
| f/f4 | 0.64 | 0.59 | 0.65 | 0.59≤f/f4≤0.66 |
| f/f6 | 0.58 | 0.59 | 0.62 | 0.58≤f/f6≤0.63 |
| TTL/f | 6.12 | 6.62 | 6.63 | 6.11≤TTL/f≤6.64 |
| ATL/Gaa | 4.13 | 3.24 | 3.35 | 3.24≤ATL/Gaa≤4.13 |

The symbols of the above are described below. f is the system focal length of the wide angle six-piece lens, R1 is the radius of curvature of the object side of the first lens L1, R2 is the radius of curvature of the image side of the first lens L1, R3 is the radius of curvature of the object side of the second lens L2, R4 is the radius of curvature of the image side of the second lens L2, R5 is the radius of curvature of the object side of the third lens L3, R6 is the radius of curvature of the image side of the third lens L3, R7 is the radius of curvature of the object side of the fourth lens L4, R8 is the radius of curvature of the image side of the fourth lens L4, R9 is the radius of curvature of the object side of the fifth lens L5, R10 is the radius of curvature of the image side of the fifth lens L5, R11 is the radius of curvature of the object side of the sixth lens L6, R12 is the radius of curvature of the image side of the sixth lens L6, TTL is the system length of the wide angle six-piece lens, ATL is the overall thickness of the wide angle six-piece lens, and Gaa is the thickness length of the optical axis of the wide angle six-piece lens. Thus, the wide angle six-piece lens provides better image quality.

In conclusion, the present invention provides following features.

1. The present invention satisfies the equation 0.29<f/f3<0.36, and hence helps balancing manufacturing sensitivity.

2. The present invention satisfies the equation 0.68<|f/f5|<0.9. Chromatic aberration can be effective corrected when the value of |f/f5| is relatively large, and the overall system length can be reduced when the value of |f/f5| is relatively small, thereby providing the present invention with miniaturization.

3. The first lens and the second lens satisfy the equation 1.5<R3/R2<4. Properties of wider angle and smaller Fno can be achieved more easily when the value of R3/R2 is relatively large, and astigmatism can be corrected when the value of R3/R2 is relatively small.

4. The present invention satisfies the equation 4.2<|D/f1|<5.4. Field curvature can be corrected when the value of |D/f1| is relatively large, and chromatic aberration can be corrected when the value of |D/f1| is relatively small.

5. The present invention satisfies the equation $$\frac{(V4 + V6)}{2} - V5 > 25,$$

and is capable of effectively correcting chromatic aberration.

6. With the aspheric object side and image side of the first lens, distortion can be effectively corrected.

7. With the convex surface as the object side of the second lens, effects of a large aperture and a wide angle can be obtained more easily.

8. Using the fourth lens, the fifth lens and the sixth lens respectively having a positive refractive power, a negative refractive power and a positive refractive power, the chromatic aberration can be well corrected.

9. With the convex surface as the object side of the sixth lens, not only the chief ray angle entering a sensor can be effectively lowered but also the amount of light for sensing can be increased.

10. By manufacturing the first lens, the second lens, the third lens, the fourth lens, the fifth lens and the sixth lens from a plastic material, an advantage of reduced production costs is provided. By manufacturing the lenses from a glass material, advantages of having high temperature endurance, scratch resistant and high transmission can be easily obtained.

What is claimed is:

1. A wide angle six-piece lens, from an object side to an image side, sequentially comprising:
   a first lens (L1), having a negative refractive power, and including an object side having a radius of curvature greater than a radius of curvature of its image side;
   a second lens (L2), having a positive refractive power, and including an object side having a radius of curvature smaller than a radius of curvature of its image side, wherein the radius of curvature of the object side of the second lens is in a positive value;
   an aperture (S);
   a third lens (L3), having a positive refractive power, and including a concave object side and a convex image side, wherein the radius of curvature of the object side of the third lens is in a negative value;
   a fourth lens (L4), having a positive refractive power, and including an object side having a radius of curvature greater than a radius of curvature of its image side, wherein the radius of curvature of the object side of the fourth lens is in a positive value;
   a fifth lens (L5), having a negative refractive power, and including an object side having a radius of curvature smaller than a radius of curvature of its image side, wherein the radius of curvature of the object side of the fifth lens is in a negative value; and
   a sixth lens (L6), having a positive refractive power, and including an object side having a radius of curvature greater than a radius of curvature of its image side, wherein the radius of curvature of the object side of the sixth lens is in a positive value;
   wherein a maximum distortion of an image generated by the wide angle six-piece lens along the image height is smaller than 8.5%;
   wherein, an overall effective focal length of the wide angle six-piece lens is f, a focal length of the third lens (L3) is f3, and an equation below is further satisfied:

$$0.29 < f/f3 < 0.36.$$

2. The wide angle six-piece lens of claim 1, wherein the image side of the first lens is a concave surface; the object side of the second lens is a convex surface; the image side of the third lens is a convex surface; both the object side and the image side of the fourth lens are convex surfaces; the object side of the fifth lens is a concave surface; the object side of the six lens is a convex surface.

3. The wide angle six-piece lens of claim 1, wherein an image side of the fourth lens (L4) is a convex surface.

4. The wide angle six-piece lens of claim 1, wherein a system length of the wide angle six-piece lens is TTL, the overall effective focal length of the wide angle six-piece lens is f, and an equation below is further satisfied:

$6.11 \leq TTL/f \leq 6.64.$

5. The wide angle six-piece lens of claim 1, wherein an object side of the first lens (L1) is a convex surface.

6. The wide angle six-piece lens of claim 1, wherein an image side of the second lens (L2) is a concave surface.

7. The wide angle six-piece lens of claim 1, wherein an image side of the fifth lens (L5) is a concave surface.

8. The wide angle six-piece lens of claim 1, wherein an image side of the sixth lens (L6) is a convex surface.

9. The wide angle six-piece lens of claim 1, wherein the overall effective focal length of the wide angle six-piece lens is f, a focal length of the fifth lens (L5) is f5, and an equation below is further satisfied:

$0.68 < |f/f5| < 0.9.$

10. The wide angle six-piece lens of claim 1, wherein a radius of curvature of the image side of the first lens (L1) is R2, a radius of curvature of the object side of the second lens (L2) is R3, and the first lens (L1) and the second lens (L2) further satisfy an equation below:

$1.5 < R3/R2 < 4.$

11. The wide angle six-piece lens of claim 1, wherein a distance from an object side of the first lens (L1) to an imaging surface (20) is D, a focal length of the first lens (L1) is f1, and an equation below is further satisfied:

$4.2 < |D/f1| < 5.4.$

12. The wide angle six-piece lens of claim 1, wherein a abbe number of the fourth lens (L4) is V4, a abbe number of the fifth lens (L5) is V5, a abbe number of the sixth lens (L6) is V6, and an equation below is further satisfied:

$$\frac{(V4 + V6)}{2} - V5 > 25.$$

13. The wide angle six-piece lens of claim 1, wherein an object side and the image side of the first lens (L1) are aspheric.

* * * * *